(12) United States Patent
Huang

(10) Patent No.: US 9,772,541 B2
(45) Date of Patent: Sep. 26, 2017

(54) ADJUSTING SEAT AND PHOTOGRAPHING DEVICE USING THE SAME

(71) Applicant: VIVOTEK INC., New Taipei (TW)

(72) Inventor: Shang-Yu Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 383 days.

(21) Appl. No.: 14/566,142

(22) Filed: Dec. 10, 2014

(65) Prior Publication Data

US 2015/0198866 A1 Jul. 16, 2015

(30) Foreign Application Priority Data

Jan. 15, 2014 (TW) .............................. 103101440 A

(51) Int. Cl.
| | |
|---|---|
| *G03B 17/56* | (2006.01) |
| *H04N 5/225* | (2006.01) |
| *H04N 7/18* | (2006.01) |
| *G03B 17/02* | (2006.01) |
| *G03B 43/00* | (2006.01) |

(52) U.S. Cl.
CPC ........... *G03B 17/561* (2013.01); *G03B 17/02* (2013.01); *G03B 43/00* (2013.01); *H04N 5/2252* (2013.01); *H04N 5/2253* (2013.01); *H04N 5/2259* (2013.01)

(58) Field of Classification Search
CPC ...... G03B 17/561; G03B 17/02; G03B 43/00; H04N 5/2252; H04N 5/2253; H04N 5/2259
USPC .......................... 396/427, 535; 348/143, 373
See application file for complete search history.

(56) References Cited

U.S. PATENT DOCUMENTS

2003/0193588 A1* 10/2003 Yuen ...................... F16M 11/10
348/275

* cited by examiner

*Primary Examiner* — Rochelle-Ann J Blackman
(74) *Attorney, Agent, or Firm* — Maschoff Brennan

(57) ABSTRACT

An adjusting seat includes a base, an adjustment unit and a worm gear. The adjusting seat has two supporting portions. The adjustment unit includes an assembly portion, two extending portions and a teeth portion. The assembly portion includes a first surface and a second surface. The two extension portions protrude from the first surface of the assembly portion so as to form an accommodation space with the assembly portion. The two extension portions are pivoted on the two support portions, respectively. The teeth portion is located on the second surface. The worm gear is pivoted on the base and meshed with the teeth portion, when the worm gear is rotated relative to the base. The teeth portion is rotated according to a rotation of the worm gear so as to drive the adjustment unit to simultaneously rotate relative to the base.

19 Claims, 7 Drawing Sheets

ADJUSTING SEAT AND PHOTOGRAPHING DEVICE USING THE SAME

CROSS-REFERENCE TO RELATED APPLICATIONS

This non-provisional application claims priority under 35 U.S.C. §119(a) on Patent Application No(s). 103101440 filed in Taiwan, R.O.C. on Jan. 15, 2014, the entire contents of which are hereby incorporated by reference.

BACKGROUND

Technical Field

The disclosure relates to a photographing device, in particularly to a photographing device with an adjusting seat.

Related Art

Surveillance cameras are widely used in different kinds of places, such as industry plants, dormitories, stores, entrances of buildings or communities, tunnels and other places less travelled. The surveillance cameras can capture and record certain occasions for reviewing and using as evidence in the future. Therefore, the surveillance cameras enhance public security in order to avoid crime.

Based on their shapes, the surveillance cameras are divided into bullet-type surveillance cameras and dome-type surveillance cameras. Because the dome-type surveillance camera is smaller in size, it can be disposed in some hidden positions in certain areas, such as outdoors or some places less travelled. Hence, people are not aware of the disposition of the dome-type surveillance camera. Moreover, in order to adjust the field of view of surveillance, an adjusting seat with a manually adjusting function is assembled on the dome-type surveillance camera for conveniently adjusting the tilt angles of the dome-type surveillance camera. Though having an advantage of adjusting the tilt angle, the total volume of this dome-type surveillance camera is significantly increased due to the addition of the adjusting seat. Thus, this kind of the dome-type surveillance camera cannot be disposed in some hidden positions because it is easy for people to see where it's located.

In short, it is a critical problem for manufacturers to develop a surveillance camera which is small in size as well as being able to adjust its angle.

SUMMARY

An embodiment of the disclosure provides an adjusting seat, comprising a base, an adjustment unit and a worm gear. The base has two supporting portions. The adjustment unit comprises an assembly portion, two extending portions and a teeth portion. The assembly portion comprises a first surface and a second surface. The two extension portions protrude from the first surface of the assembly portion so as to form an accommodation space with the assembly portion. The two extension portions are pivoted on the two support portions, respectively. The teeth portion is located on the second surface. The worm gear is pivoted on the base and meshed with the teeth portion, when the worm gear is rotated relative to the base. The teeth portion is rotated according to a rotation of the worm gear so as to drive the adjustment unit to simultaneously rotate relative to the base.

Another embodiment of the disclosure provides a photographing device, comprising the foregoing adjusting seat and an image sensor assembled in the accommodation space of the adjusting seat.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
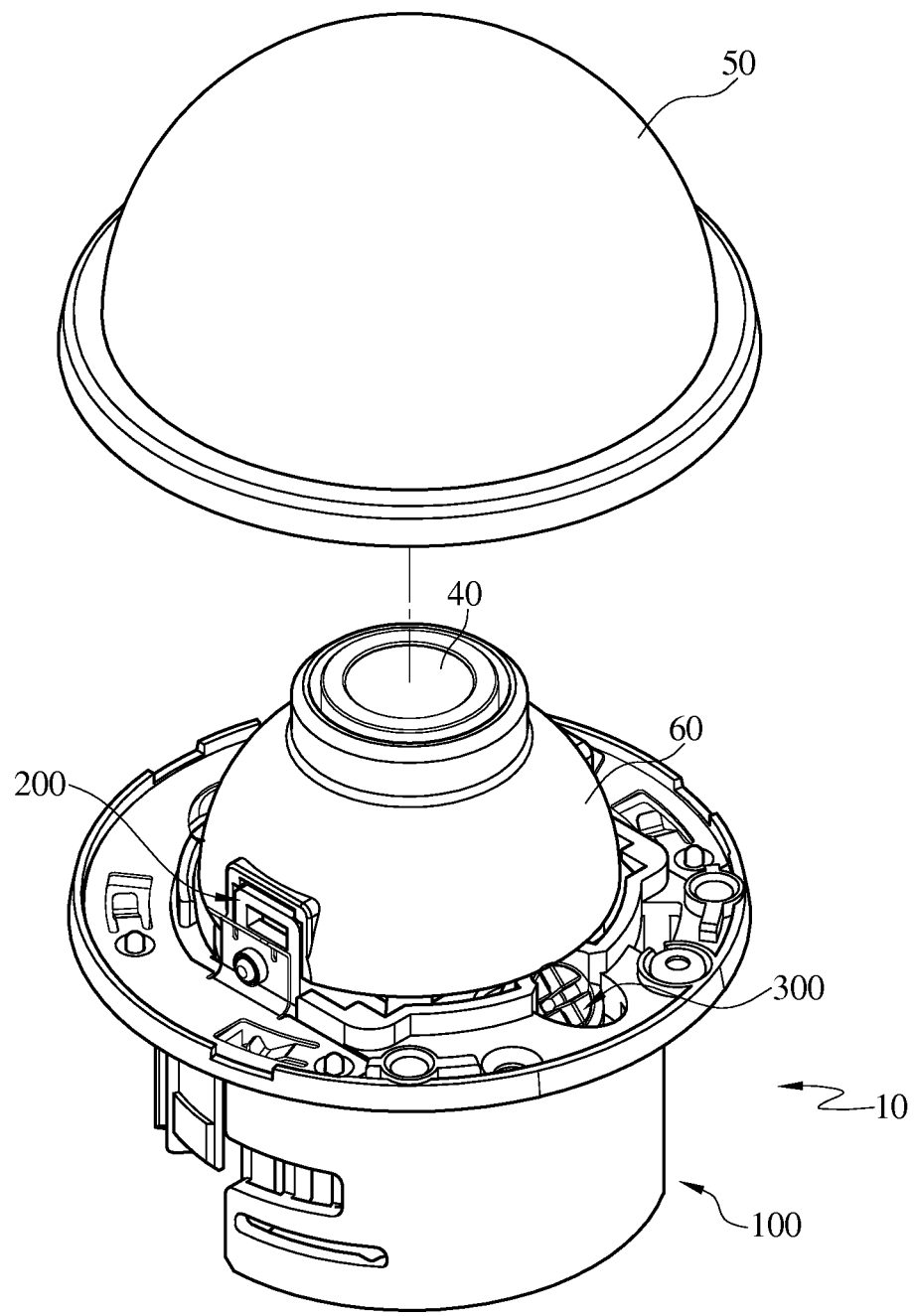
FIG. 1A is an exploded view of a photographing device according to a first embodiment of the disclosure.
Figure 1B:
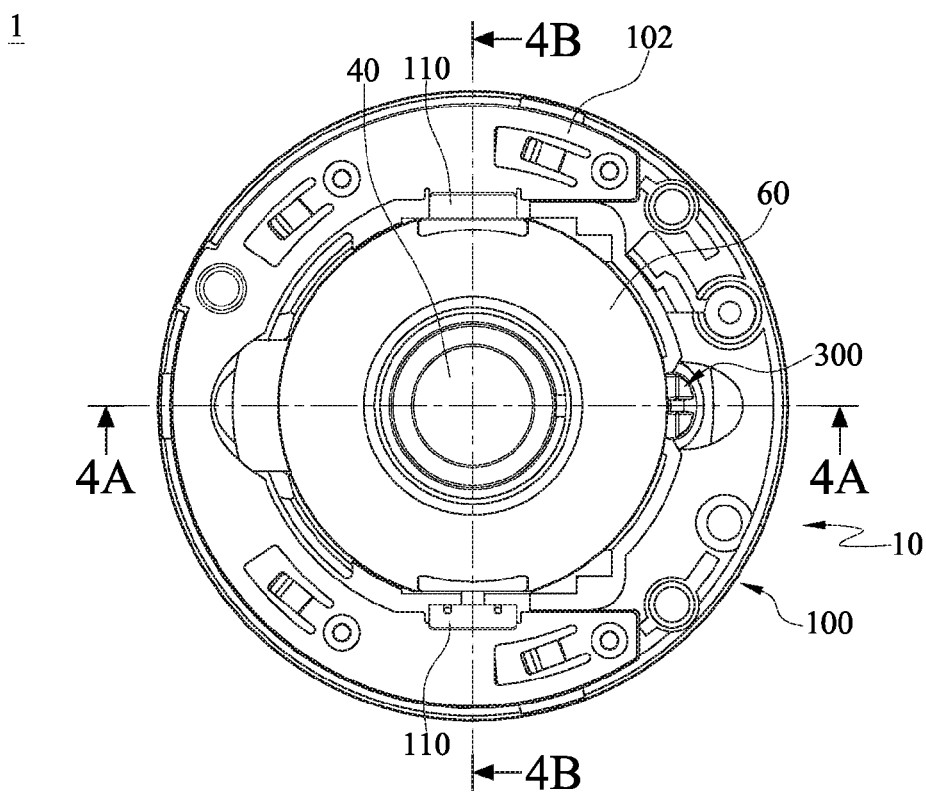
FIG. 1B is a top view of the photographing device without a light-permeable cover in FIG. 1A.
Figure 2:
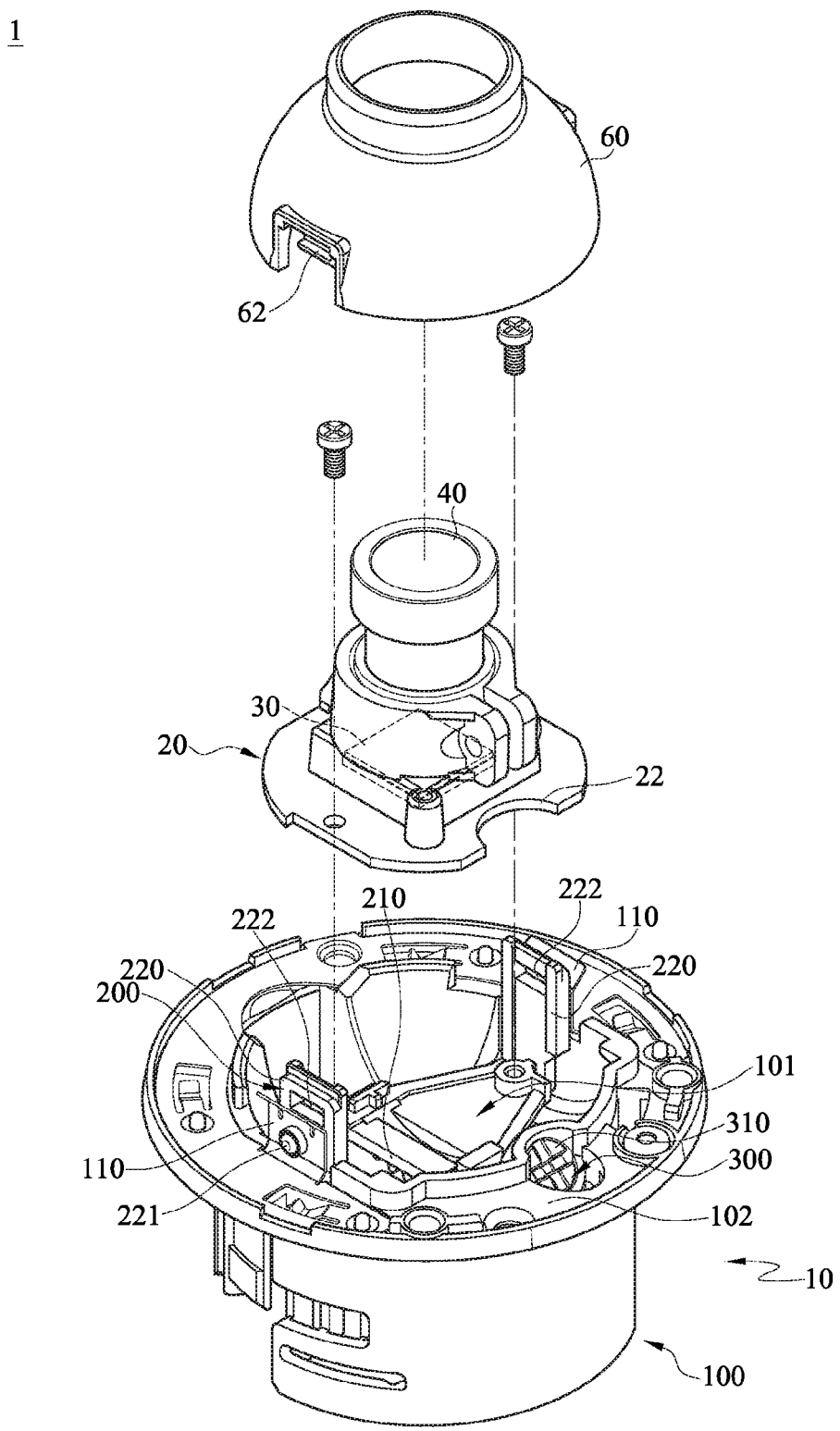
FIG. 2 is an exploded view of the photographing device without the light-permeable cover in FIG. 1A.
Figure 3:
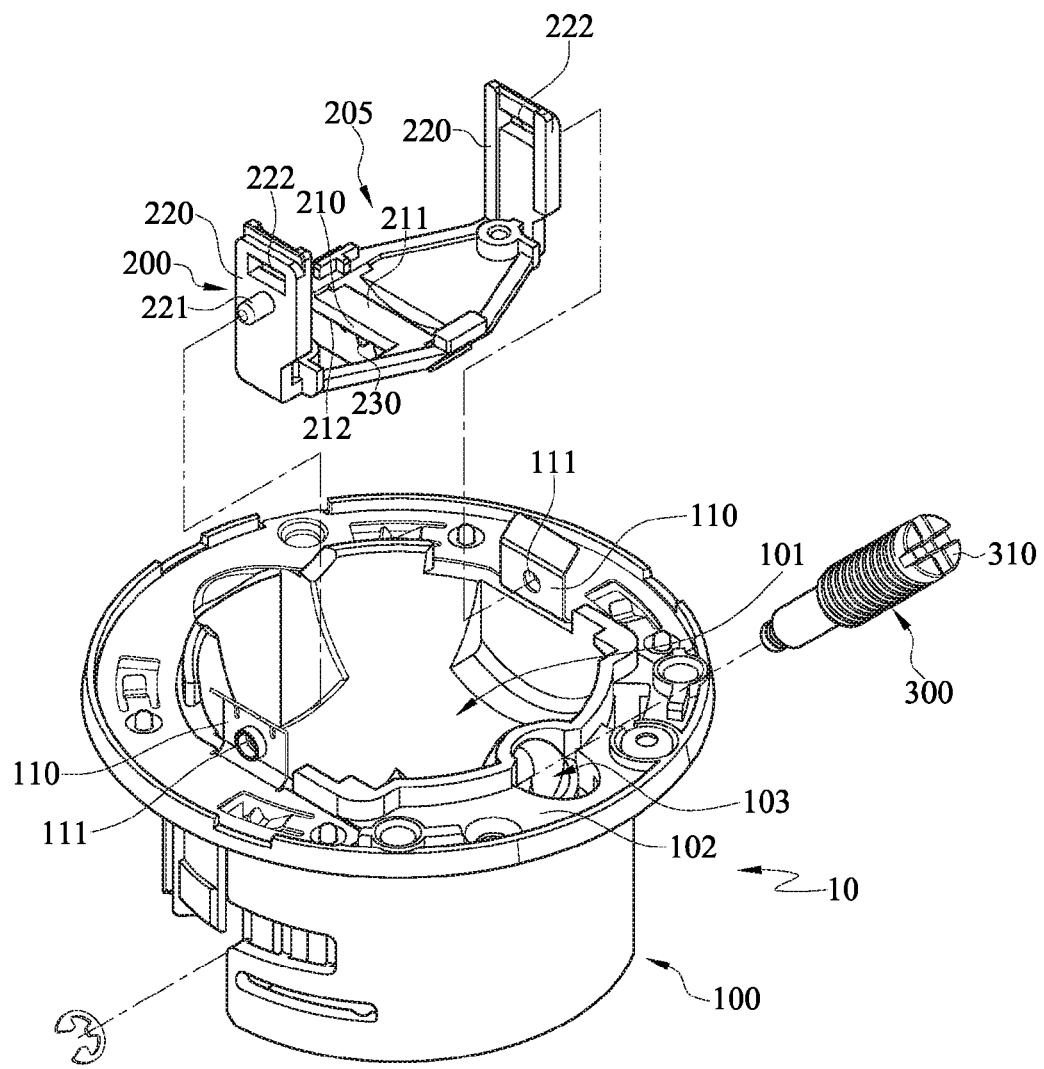
FIG. 3 is an exploded view of an adjusting seat in FIG. 2.
Figure 4A:
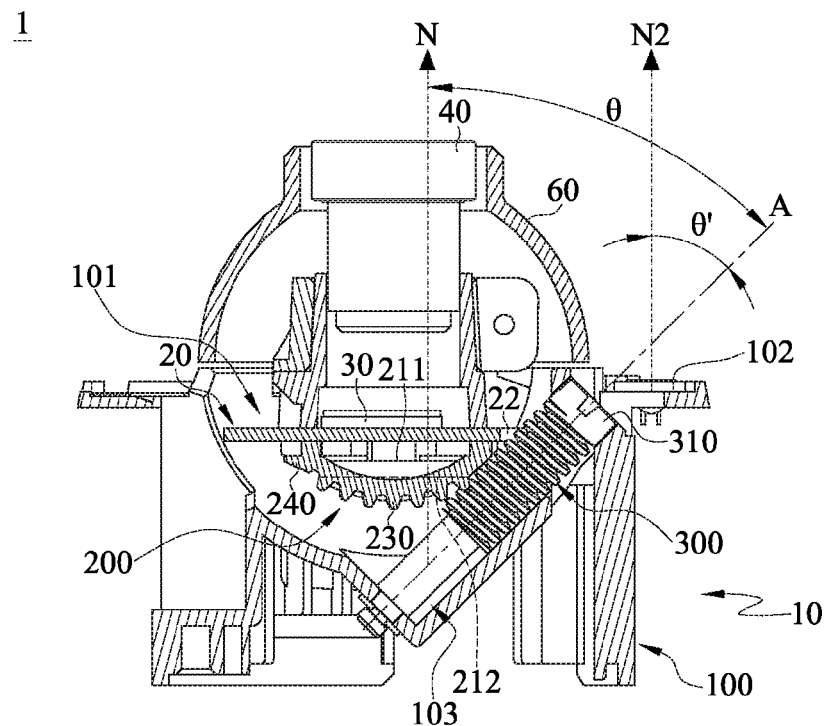
FIG. 4A is a cross-sectional view of the photographing device along a line 4A-4A in FIG. 1B.
Figure 4B:
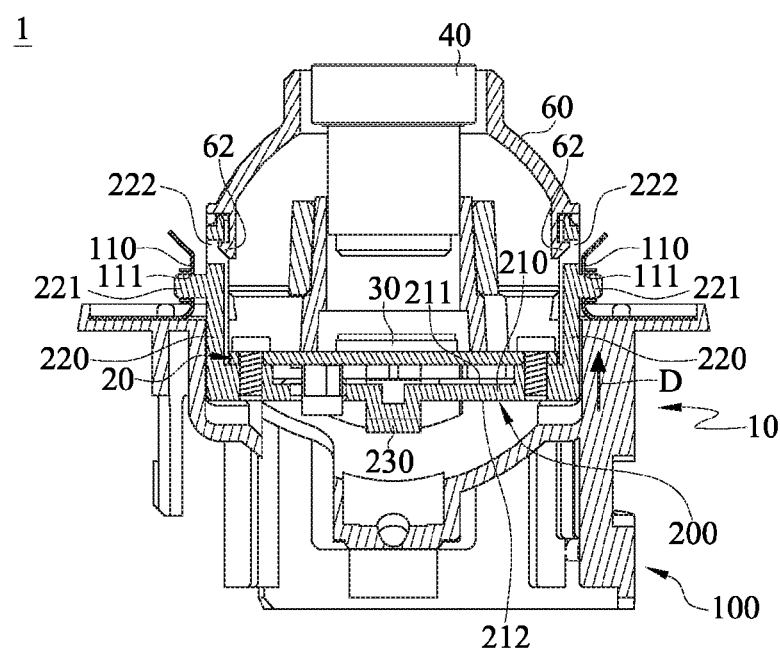
FIG. 4B is a cross-sectional view of the photographing device along a line 4B-4B in FIG. 1B.

Please refer to FIG. 1A through FIG. 4B. FIG. 1A is an exploded view of a photographing device according to a first embodiment of the disclosure, FIG. 1B is a top view of the photographing device without a light-permeable cover in FIG. 1A, FIG. 2 is an exploded view of the photographing device without the light-permeable cover in FIG. 1A, FIG. 3 is an exploded view of an adjusting seat in FIG. 2, FIG. 4A is a cross-sectional view of the photographing device along a line 4A-4A in FIG. 1B, and FIG. 4B is a cross-sectional view of the photographing device along a line 4B-4B in FIG. 1B. The photographing device 1 in this embodiment of the disclosure comprises an adjusting seat 10, an image sensor 30, a lens 40, a light-permeable cover 50 and a lens cover 60.

The adjusting seat 10 comprises a base 100, an adjustment unit 200 and a worm gear 300.

The base 100 comprises two support portions 110. Each support portion 110 has an axial hole 111. The base 100 has an accommodating room 101, a top surface 102 and a through hole 103. The accommodating room 101 extends from the top surface 102, and the through hole 103 is on the top surface 102 and located at a side of the accommodating room 101.

The adjustment unit 200 comprises an assembly portion 210, two extension portions 220 and a teeth portion 230. The assembly portion 210 comprises a first surface 211 and a second surface 212. The first surface 211 and the second surface 212 are opposite to each other. The two extension portions 220 protrude outwardly from the first surface 211 of the assembly portion 210, in a direction D from the second surface 212 to the first surface 211 so that the two extension portions 220 and the assembly portion 210 form an accommodation space 205 together. Each extension portion 220 comprises a protruding axle 221 and an indentation 222. The protruding axles 221 of the two extension portions 220 are pivoted in the axial holes 111 of the two support portions 110 so that the adjustment unit 200 is for rotating about the protruding axles 221 as a rotation axis and in relative to the base 100. The teeth portion 230 is located on the second surface 212, and the teeth portion 230 is a spur gear. Since the teeth portion 230 of the adjustment unit 200 is the spur gear, it is easy for manufacturers to manufacture and integrate all of the assembly portion 210, the two extension portions 220 and the teeth portion 230 into a single unit by injection molding, thereby miniaturizing the adjustment unit 200.

In addition, the disclosure is not limited to the foregoing two axial holes 111 of the support portion 110 matching with the two protruding axles 221 of extension portion 220. In other embodiment, each of the two extension portions 220 comprises an axial hole (not shown), each of the two support portions 110 comprises a protruding axle (not shown), and the two protruding axles are pivoted in the two axial holes, respectively.

The worm gear 300 is pivoted on the base 100 and meshes with the teeth portion 230. The through hole 103 exposes the worm gear 300. When the worm gear 300 rotates relative to the base 100, the teeth portion 230 is driven by the rotation of the worm gear 300 to rotate accordingly, which also simultaneously drives the adjustment unit 200 to rotate about the protruding axle 221 as a rotation axis and relative to the base 100. In this embodiment, the worm gear 300 slopes towards the adjustment unit 200, which means an axis A of the worm gear 300 and a normal line N of the first surface 211 form an acute angle $\theta$ therebetween. That is, the worm gear 300 is inclined. In another way to described the position of the worm gear 300, the axis A of the worm gear 300 has an acute angle $\theta'$ with respect to a normal line N2 of the top surface 102 of the base 100. There is a difference between when the worm gear 300 slopes towards the adjustment unit 200 and when the worm gear 300 is vertically disposed on the adjustment unit 200. The difference is that when the worm gear 300 is vertically disposed on the adjustment unit 200, the contact point of the worm gear 300 and the teeth portion 230 is located at a lateral side between the first surface 211 and the second surface 212 of the assembly portion 210. Accordingly, the teeth portion 230 needs to extend to the lateral side between the first surface 211 and the second surface 212, which may increase the total volume of the adjustment unit 200. Therefore, in this embodiment, the worm gear 300 has an inclination to the adjustment unit 200 such that the contact point of the worm gear 300 and the teeth portion 230 is below the second surface 212 of the assembly portion 210. The teeth portion 230 is only needed to be located on the second surface 212, so the teeth portion 230 does not need to extend to the lateral side between the first surface 211 and the second surface 212, thereby reducing the total width and span of the adjustment unit 200.

The circuit board 20 and the image sensor 30 are disposed in the accommodation space 205. The circuit board 20 is affixed to the assembly portion 210, and the image sensor 30 is electrically connected to the circuit board 20.

Moreover, the worm gear 300 further comprises an adjustment portion 310, and the circuit board 20 further comprises a cut-out 22. The worm gears 300 passes through the cut-out 22 such that the adjustment portion 310 protrudes outwardly from the first surface 211 of the assembly portion 210 (as shown in FIG. 4A). In this way, a user can rotate the worm gear 300 manually to adjust the tilt angle of the adjustment unit 200 thanks to the exposure of the adjustment portion 310.

In this and some other embodiments, the adjustment unit 200 further comprises a blocking portion 240. The blocking portion 240 is located on an end of the teeth portion 230. The blocking portion 240 is for being pressed against the worm gear 300 in order to prevent the adjustment unit 200 form over rotation. When the adjustment unit 200 is over rotated to a certain degree (that is, rotates too much), the circuit board 20 may hit the worm gear 300 or the worm gear 300 may separate from the teeth portion 230 to lose transmission of force. Therefore, the disposition of blocking portion 240 can prevent the failure of the transmission of force.

The lens 40 is assembled on the image sensor 30, and the image sensor 30 is for sensing an image captured by the lens 40.

The light-permeable cover 50 is assembled on the base 100 of the adjusting seat 10 for covering the image sensor 30 and the lens 40. Thus, the light-permeable cover 50 can protect internal components (such as the lens 40, the image sensor 30 and the adjustment unit 200) from damage.

The lens cover 60 comprises two hooks 62. The two hooks 62 are detachably assembled on the two indentations 222. The lens cover 60 not only covers the lens 40 but also supports the two extension portions 220, which enhances the strength of the adjustment unit 200.

Figure 5:
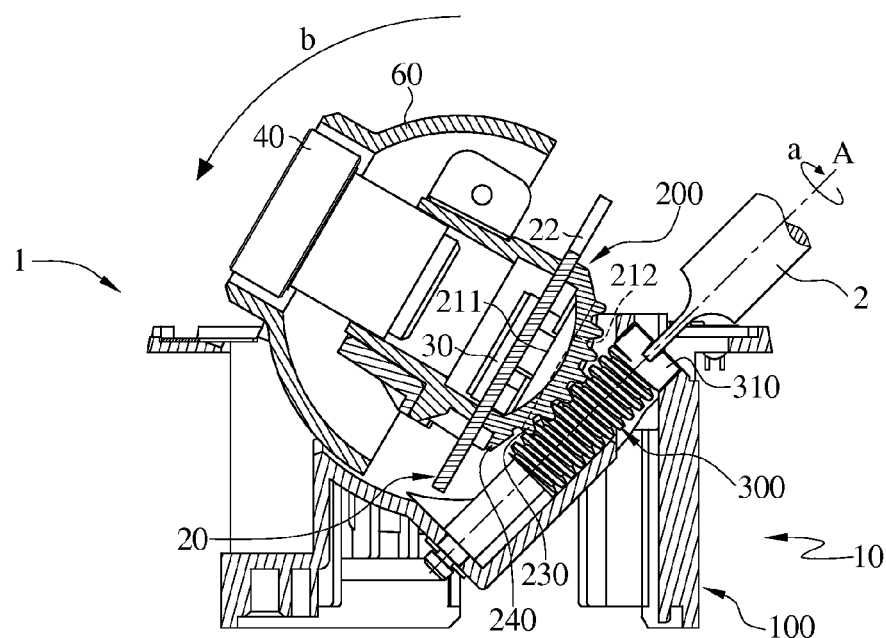
FIG. 5 is a cross-sectional view of the photographing device in FIG. 1B when a tilt angle of an adjusting seat is adjusted.

Please refer to FIG. 5, is a cross-sectional view of the photographing device in FIG. 1B when a tilt angle of the adjusting seat is adjusted. Before adjusting the tilt angle of the adjusting seat 10, a user can detach the light-permeable cover 50 from the photographing device 1 so as to expose the adjustment portion 310 of the worm gear 300. Then, an adjusting tool 2 (e.g., a screwdriver) is applied to inset the adjustment portion 310 to adjust the tilt angle of the adjustment unit 200. For instance, when being rotated around an arrow a, the adjusting tool 2 drives the adjustment unit 200 to rotate along an arrow b for adjusting the tilt angle. When the adjustment unit 200 rotates to the maximum degree, the blocking portion 240 blocks the worm gear 300 to prevent the worm gear 300 from keeping moving, which prevents the worm gear 300 and the circuit board 20 from interference between each other or prevents the worm gear 300 from separating from the teeth portion 230 to lose the transmission of force.

Figure 6:
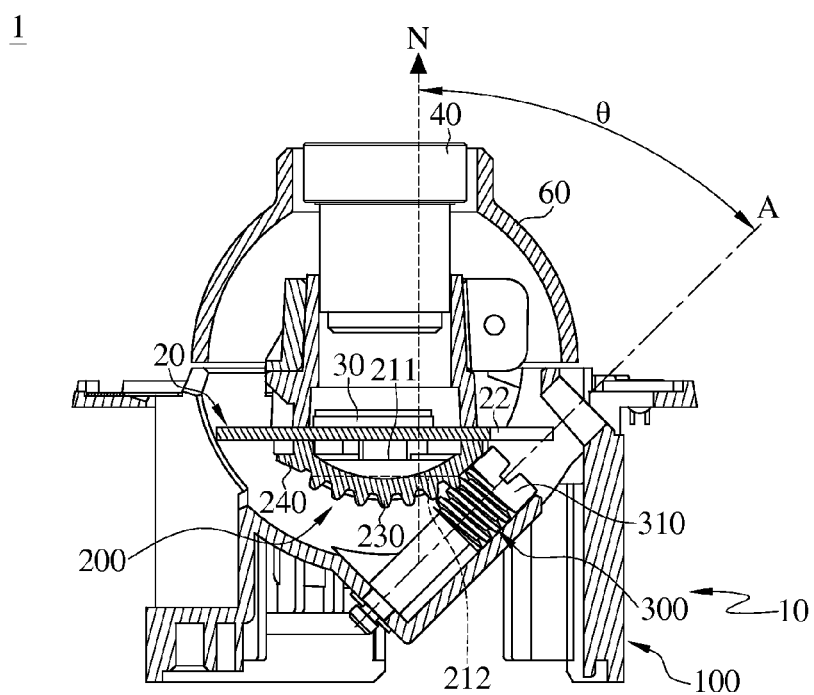
FIG. 6 is a cross-sectional view of a photographing device without a light-permeable cover according to a second embodiment of the disclosure.

Please refer to FIG. 6, which is a cross-sectional view of a photographing device without a light-permeable cover according to a second embodiment of the disclosure. Since the structure of the photographing device in this embodiment is similar to that in the first embodiment shown in FIG. 4A, only the differences are described as follows. As shown in FIG. 4A, the worm gear 300 passes through the cut-out 22 of the circuit board 20. On the other hand, as shown in FIG. 6, the worm gear 300 in this embodiment does not pass through the cut-out 22 of the circuit board 20. The cut-out 22 only exposes the adjustment portion 310 of the worm gear 300. A user still can use the adjusting tool 2 to pass through the cut-out 22 to adjust the tilt angle of the adjustment unit 200.

Figure 7:
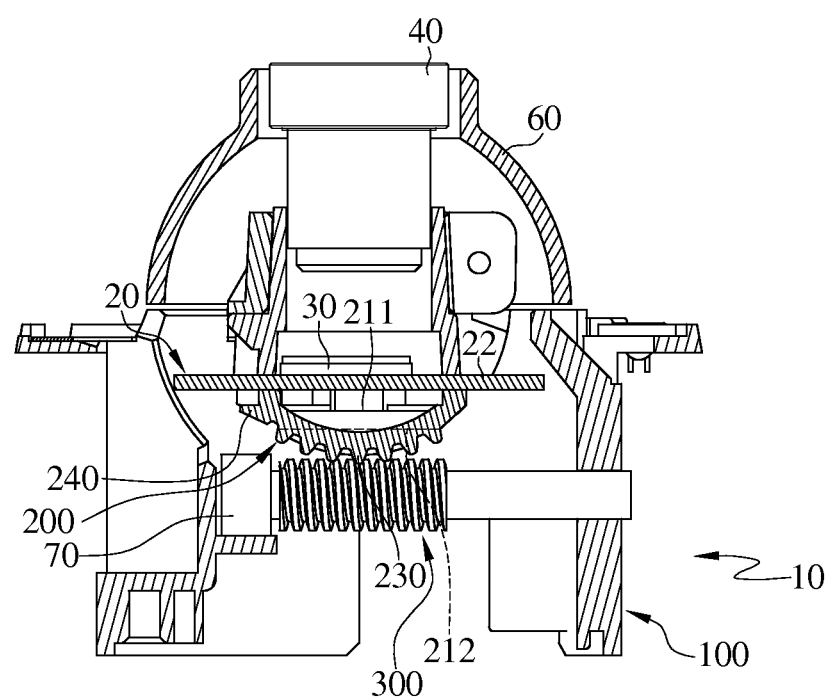
FIG. 7 is a cross-sectional view of a photographing device without a light-permeable cover according to a third embodiment of the disclosure.

Please refer to FIG. 7, which is a cross-sectional view of a photographing device without a light-permeable cover according to a third embodiment of the disclosure. Since the structure of the photographing device in this embodiment is similar to that in the first embodiment shown in FIG. 4A, only the differences are described as follows.

According to the embodiment shown in FIG. 4A, the adjusting tool 2 is applied to rotate the adjustment portion 310 of the worm gear 300 in order to adjust the tilt angle of the adjusting seat 10. That is, the worm gear 300 needs to slant the adjustment unit 200 so as to expose the adjustment portion 310 of the worm gear 300. However, referring to FIG. 7, the photographing device 1 in this embodiment further comprises a driving motor 70. The driving motor 70 is for driving the worm gear 300 to rotate in order to adjust the tilt angle of the adjusting seat 10. Consequently, the worm gear 300 does not need to slant the adjustment unit 200 for exposure of the adjustment portion 310 of the worm gear 300. On the other hand, when the photographing device 1 is driven by the driving motor 70, the worm gear 300 can be horizontally disposed and can be hidden inside the base 100 (as shown in FIG. 7).

According to the adjusting seat and the photographing device using the same disclosed in the disclosure, the worm gear slopes to the adjustment unit 200. The contact point of the worm gear and the teeth portion is moved downward so the teeth portion does not need to extend to the lateral side of the assembly portion. Accordingly, the adjusting seat is miniaturized such that it is easy for the photographing device to be hidden in a desired place. Also, the control of the tilt angle is manual, so it is also convenient for the user to operate.

Moreover, the teeth portion is a spur gear, so the assembly portion, the two extension portions and the teeth portion can be manufactured and integrated into a single unit, which further reduces the total volume of the adjustment unit.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

What is claimed is:

1. An adjusting seat, comprising:
    a base with two supporting portions;
    an adjustment unit comprising an assembly portion, two extension portions and a teeth portion, the assembly portion comprising a first surface and a second surface which are opposite to each other, the two extension portions protruding from the first surface of the assembly portion in a direction from the second surface to the first surface so as to form an accommodation space with the assembly portion, the two extension portions pivoted on the two support portions, respectively, and the teeth portion located on the second surface; and
    a worm gear pivoted on the base and meshed with the teeth portion, when the worm gear is rotated relative to the base, the teeth portion is rotated according to a rotation of the worm gear so as to drive the adjustment unit to simultaneously rotate relative to the base.

2. The adjusting seat according to claim 1, wherein an axis of the worm gear and a normal line of the first surface forms an acute angle therebetween.

3. The adjusting seat according to claim 1 wherein the assembly portion, the two extension portions and the teeth portion are integrated into a single unit.

4. The adjusting seat according to claim 1 wherein the teeth portion is a spur gear.

5. The adjusting seat according to claim 1, wherein each of the two support portions comprises an axial hole, each of the two extension portions comprises a protruding axle, the two protruding axles are pivoted in the two axial holes, respectively, when the worm gear is rotated relative to the base, the teeth portion is driven by the rotation of the worm gear to make the adjustment unit rotate relative to the base and rotate about the protruding axle as a rotation axis.

6. The adjusting seat according to claim 1, wherein each of the two extension portions comprises an axial hole, each of the two support portions comprises a protruding axle, the two protruding axles are pivoted in the two axial holes, respectively, when the worm gear is rotated relative to the base, the teeth portion is driven by the rotation of the worm gear to make the adjustment unit rotate relative to the base and rotate about the protruding axle as a rotation axis.

7. The adjusting seat according to claim 1, wherein the adjustment unit further comprises a blocking portion, and the blocking portion is located on an end of the teeth portion.

8. A photographing device, comprising:
    the adjusting seat of claim 1; and
    an image sensor assembled in the accommodation space of the adjusting seat.

9. The photographing device according to claim 8, further comprising a lens assembled on the image sensor, and the image sensor being for sensing an image captured by the lens.

10. The photographing device according to claim 9, further comprising a light-permeable cover assembled on the base of the adjusting seat for covering the image sensor and the lens.

11. The photographing device according to claim 8, further comprising a circuit board, the image sensor disposed on the circuit board, both the image sensor and the circuit board disposed in the accommodation space, the circuit board comprising a cut-out, an end of the worm gear comprising an adjustment portion, and the cut-out exposing the adjustment portion of the worm gear.

12. The photographing device according to claim 8, further comprising a driving motor disposed on the base, and the driving motor being for driving the worm gear to rotate relative to the base.

13. An adjusting seat, comprising:
    a base having an accommodating room, a top surface, a through hole and two supporting portions, wherein the accommodating room extends from the top surface, and the through hole is on the top surface and located at a side of the accommodating room;
    an adjustment unit pivotally disposed on the base, the adjustment unit comprising a teeth portion located in the accommodating room; and
    a worm gear pivoted on the base and meshed with the teeth portion, wherein the through hole exposes the worm gear, and an axis of the worm gear has an acute angle with respect to a normal line of the top surface of the base; when the worm gear is rotated relative to the base, the teeth portion is rotated according to a rotation of the worm gear so as to drive the adjustment unit to simultaneously rotate relative to the base.

14. The adjusting seat according to claim 13, wherein the adjustment unit further comprises an assembly portion and two extension portions, the assembly portion comprises a first surface and a second surface which are opposite to each other, the two extension portions protrude from the first surface of the assembly portion in a direction from the second surface to the first surface so as to form an accommodation space with the assembly portion, the two extension portions are pivoted on the two support portions, respectively, and the teeth portion located on the second surface.

15. The adjusting seat according to claim 14, wherein the assembly portion, the two extension portions and the teeth portion are integrated into a single unit.

16. The adjusting seat according to claim 13, wherein the teeth portion is a spur gear.

17. The adjusting seat according to claim 14, wherein each of the two support portions comprises an axial hole, each of the two extension portions comprises a protruding axle, the two protruding axles are pivoted in the two axial holes, respectively, when the worm gear is rotated relative to the base, the teeth portion is driven by the rotation of the worm gear to make the adjustment unit rotate relative to the base and rotate about the protruding axle as a rotation axis.

18. The adjusting seat according to claim 14, wherein each of the two extension portions comprises an axial hole, each of the two support portions comprises a protruding axle, the two protruding axles are pivoted in the two axial holes, respectively, when the worm gear is rotated relative to the base, the teeth portion is driven by the rotation of the worm gear to make the adjustment unit rotate relative to the base and rotate about the protruding axle as a rotation axis.

19. The adjusting seat according to claim 13, wherein the adjustment unit further comprises a blocking portion, and the blocking portion is located on an end of the teeth portion.

* * * * *